UNITED STATES PATENT OFFICE.

HAYDN M. BAKER, OF ROCHESTER, NEW YORK, ASSIGNOR TO A. M. HASTINGS AND ALEXANDER McVEAN.

IMPROVED PROCESS FOR BLEACHING FIBROUS MATERIALS.

Specification forming part of Letters Patent No. 58,935, dated October 16, 1866.

*To all whom it may concern:*

Be it known that I, HAYDN M. BAKER, of Rochester, in the county of Monroe and State of New York, have invented new and useful Processes for Bleaching Paper Stock or Pulp; and I do hereby declare that the following is a full and exact description thereof.

The nature of my invention consists in the application of any substance capable of producing decomposition of organic or inorganic coloring-matter which may be combined with the material to be treated (thereby destroying its chemical structure, consequently decolorizing or changing the relation of its properties to the absorption of light) to the said stock or material in a tight vessel capable of receiving and sustaining any reasonable degree of pressure, the said vessel being so constructed as to revolve on its axis, or otherwise provided with an agitator, for the purpose of keeping the stock in an agitated condition, that intimate contact of the substance to be bleached and the element or compound used to decolorize may be attained and maintained.

The pressure may be obtained by mechanical appliances; or when gases are used for effecting the removal or change of the coloring-matter, then the said pressure may be obtained by the natural expansion of the aforesaid gases themselves by liberating the same in the aforesaid tight vessel, (containing the stock to be treated, water, and the chemical element or compound used for decolorizing,) the said gases having been previously combined with any other chemical substance which will retain them in a diminutive space, and from which they may be set free by displacement.

To enable others skilled in the art of bleaching to make use of my invention, I will proceed to describe it more particularly.

The first object to attain is to provide an iron tank or rotary of suitable strength to resist pressure, and so constructed as to admit of its being readily charged with the material under treatment. I then half fill the said vessel with the material to be bleached; then close the man-holes or places of charging and discharging and secure them. I next inject a solution of chloride of lime of any desirable strength, and then make the vessel tight by closing the vent-cock. I now generate carbonic acid by any economical method I may elect, and allow it to enter the bleaching-tank or rotary by its own expansion or pressure. The said carbonic acid combines with the lime of the chloride of lime, forming carbonate of lime, and sets chlorine gas free, the said chlorine gas uniting with the hydrogen of the coloring-matter, (if the proper state of humidity has been attained,) forming hydrochloric acid, which remains in solution, and at the same time it leaves a new and colorless compound in the material treated.

Any other acid than carbonic acid which has more affinity for lime than chlorine may be used; but most other acids would require mechanical appliances to force them into the bleaching apparatus.

When I use sulphurous acid for bleaching, I generate the same by the combustion of sulphur, and then force it into the bleaching apparatus by mechanical appliances, said bleaching apparatus being always, during the bleaching process, in a state or condition of rotation, to occasion agitation of the material treated.

When I use oxygen gas I generate the same by heating protoxide of manganese in a clay vessel to a sufficiently-elevated temperature to expel one equivalent of oxygen, and allow the same to pass into the bleaching apparatus and come in contact with the material under treatment, which must also be heated to a sufficiently-elevated temperature to enable the said oxygen gas to combine with the hydrogen of the coloring-matter, forming water, and then leave the newly-formed compound in the aforesaid material. Protoxide of manganese will be left in the clay retort, but by removal and exposure to the atmosphere at a temperature of 550° Fahrenheit absorbs oxygen and is converted into protoxide of manganese again, and may be used over an indefinite number of times.

I also bleach straw and other fibrinous substances by deoxidation or removal of one equivalent of the oxygen. In this process the oxygen is removed by nascent hydrogen, (hydrogen leaving another substance and coming in direct contact with the substance containing the oxygen to be removed,) the said hydrogen being generated or evolved by any method the operator may select; but I prefer to obtain it by charging lime and sulphate of iron into the bleaching apparatus with the substance to be decolorized, or by decomposing water with iron-turnings and sulphuric acid, which may be done in a separate vessel, and the hydrogen evolved conveyed to the said bleaching-vessel, its own pressure inducing decomposition of the coloring-matter. The sulphate of iron formed by the action of the water, sulphuric acid, and iron-turnings is a commercial article, and may be disposed of to advantage.

I also make use of another hydrogen process, which I consider far more economical than any heretofore known, inasmuch as it reduces the straw to the state or condition of "half-stuff" without recourse to alkaline treatment. It consists in charging the rotary with cut straw, and then passing over or through the same under elevated pressure superheated steam and hydrogen gas. The steam may be heated to any temperature less than will clear or carbonize the vegetable matter. The hydrogen is produced by passing the steam through iron-turnings inclosed in a strong iron cylinder vessel, the said vessel being embedded in a fire, for the purpose of transmitting heat to the iron-turnings. The steam passing over the heated iron-turnings is partly decomposed, the oxygen of said steam combining with the iron, forming oxide of iron, and the hydrogen set free, while the excess of steam becomes superheated and passes with the hydrogen gas into the rotary.

These processes require a certain degree of chemical knowledge to apply them with different substances to be decolorized, and to do so with economy.

I do not wish to claim the application of mechanical, pneumatic, or hydraulic pressure in the bleaching of fibrinous substances; but What I wish to claim, and desire to secure by Letters Patent, is—

1. The application, to the bleaching of fibrinous or other substances, of chlorine, hydrogen, oxygen, and sulphurous-acid gases in a close vessel under their own pressure while in a nascent or free state, in the manner herein described and set forth, or any other processes substantially the same, and which produce the same intended effects and results herein described.

2. The use of carbonic (or any other) acid under pressure for the purpose of decomposing chloride of lime in a close bleaching apparatus, in the manner herein described, or any other substantially the same, and which produces the same intended effects.

3. The application of oxygen, hydrogen, and sulphurous acid under pressure in bleaching.

HAYDN M. BAKER.

Witnesses:
 ROBT. J. LESTER,
 ALEX. MCVEAN.